(12) United States Patent
Backman, III

(10) Patent No.: US 7,571,521 B1
(45) Date of Patent: Aug. 11, 2009

(54) ELASTIC TIE DOWN

(76) Inventor: Carl A. Backman, III, 32 Rochambault St., Haverhill, MA (US) 01832

( * ) Notice: Subject to any disclaimer, the term of this patent is extended or adjusted under 35 U.S.C. 154(b) by 0 days.

(21) Appl. No.: 12/275,433

(22) Filed: Nov. 21, 2008

Related U.S. Application Data

(62) Division of application No. 11/158,244, filed on Jun. 21, 2005, now Pat. No. 7,454,818.

(51) Int. Cl.
*A44B 21/00* (2006.01)
(52) U.S. Cl. ..................... 24/300; 24/68 CD
(58) Field of Classification Search ............. 24/300, 24/301, 68 CD
See application file for complete search history.

(56) References Cited

U.S. PATENT DOCUMENTS

| | | | |
|---|---|---|---|
| 1,296,057 A | 3/1919 | Ellsworth | |
| 2,117,322 A | 5/1938 | Hillman | |
| 2,991,524 A | 1/1961 | Dobrikin | |
| 3,353,817 A | 11/1967 | Bollinger | |
| 3,817,507 A | 6/1974 | Derman et al. | |
| 3,860,226 A | 1/1975 | Hensiek Jr. | |
| 4,694,541 A | 9/1987 | Skyba | |
| 4,754,531 A | 7/1988 | Skyba | |
| 4,762,208 A | 8/1988 | Reynier et al. | |
| 4,992,629 A | 2/1991 | Morais | |
| 5,052,602 A | 10/1991 | Duchi et al. | |
| 5,333,442 A * | 8/1994 | Berger ..................... | 57/314 |
| 6,014,794 A | 1/2000 | Mc Coy | |

OTHER PUBLICATIONS

Bungy Mooring line compensator Internet Advertisement.
Kwik Tek bungee dock line Internet Advertisement.

\* cited by examiner

*Primary Examiner*—Robert J Sandy
(74) *Attorney, Agent, or Firm*—Altman & Martin; Steven K Martin

(57) ABSTRACT

A tie down for connecting two objects. The tie down has an elastic tube having an unstretched state and a stretched state, a braided line extending through the tube, with the line having a compressed state and an uncompressed state, and a mechanical securement at each tube end to secure the line to the tube such that the line is in its compressed state when the tube is in its unstretched state and the line is in its uncompressed state when the tube is in its stretched state. Each end has an attachment for attaching to the objects.

8 Claims, 3 Drawing Sheets

ELASTIC TIE DOWN

CROSS-REFERENCES TO RELATED APPLICATIONS

The present application is a divisional application of application Ser. No. 11/158,244, filed Jun. 21, 2005 for Elastic Tie Down in the name of Carl A. Backman III.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to tethers, more particularly, to expandable tethers for securing boats and the like.

2. Description of the Related Art

The elastic tie down is a well-known device developed to restrain an object from moving away from a another object, for example, a boat from a dock. Elastic tie downs permit some relative movement between the restrained objects so that small relative motions can be accommodated without creating large stresses and damage to the restrained objects.

To prevent overstressing the tie down to the breaking point, it is known to combine a limiting component with an elastic component. The elastic component provides resilient restraint against separation, and the limiting component remains slack. When the separating force reaches a predetermined value, the elastic component becomes stretched such that the limiting component is taut and prevents further stretching of the elastic component. Examples of such tie downs are disclosed in U.S. Pat. Nos. 1,296,057, 2,991,524, and 4,694,541. The main shortcoming of these tie downs is their bulk. The elastic component is an elastic tube through which the limiting component, such as an inelastic rope, extends. When there is no separating force on the tie-down, the rope is bundled haphazardly within the tube, meaning that the tube must be several times the thickness of the rope, depending upon the amount of stretch permitted.

In an alternate construction, the elastic component forms a core to a braided line, the limiting component. When the elastic component is not stretched, the braided line is compressed. Since the line is not bundled, the tie down is thinner than the tie downs with the internal limiting component. However, since the braid on the line is a cross-hatch of threads, it is not smooth and easy to snag, particularly in the unstretched condition.

BRIEF SUMMARY OF THE INVENTION

An object of the present invention is to provide an elastic tie down that is less bulky and less prone to snag than those of the prior art.

The present invention is a tie down for connecting two objects. It has an elastic tube having an unstretched state and a stretched state, a braided line extending through the tube, with the line having a compressed state and an uncompressed state, and a securement at each tube ends to secure the line to the tube such that the line is in its compressed state when the tube is in its unstretched state and the line is in its uncompressed state when the tube is in its stretched state. There is an attachment at each end for attaching to the objects.

In one configuration of the tie down, the inside diameter of the unstretched tube is at least as large as the compressed diameter of the line so that the line can fully compress within the tube without causing radially stretching of the tube. In another configuration, the inside diameter of the unstretched tube is at least as large as the uncompressed diameter of the line so that the fully compressed line causes the tube to stretch radially.

The securement can come in a number of different forms and must be strong enough to prevent separation of the tube from the line while at full extension. The present invention contemplates the use of adhesives, mechanical clamps, and heat shrink tubing. Mechanical clamps can be either permanent or temporary.

Optionally, a lubricant is used in the tube to reduce wear as a result of the friction between the line and tube as the tie down is stretched and relaxed.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 2:
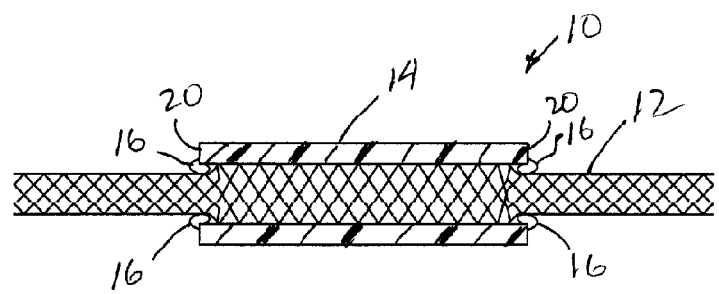
FIG. 2 is a side, cutaway view of the tie down of FIG. 1 in its quiescent state.
Figure 3:
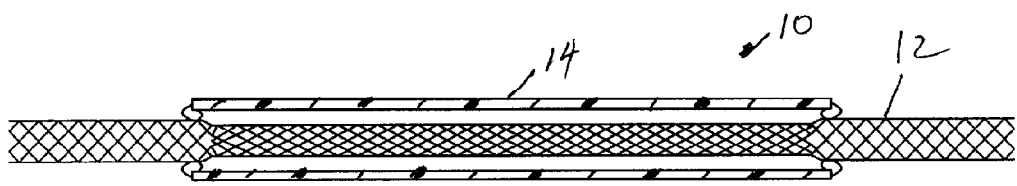
FIG. 3 is a side, cutaway view of the tie down of FIG. 1 in its stretched state.

The present invention is an elastic tie down that combines a narrow cross-section with a smooth exterior. The tie down 10, shown in FIG. 1, has a braided line 12 extending through an elastic tube 14. The line 12 is secured to the tube 14 at the ends 20 of the tube 14, as at 16. The ends of the tie down 10 has attachments 18 for attaching the tie down to the item to be secured. In its quiescent state, the tube 14 is unstretched and the line 12 is compressed within the tube 14, as in FIG. 2. In its stretched state, the tube 14 is stretched until the line 12 is taut, as in FIG. 3.

Figure 4:
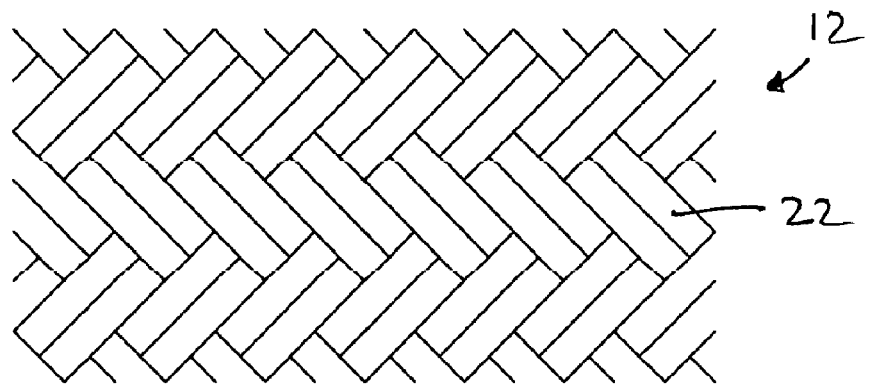
FIG. 4 is an enlarged view of a braided line.

The line 12 for use by the present invention is braided. Braided line is made by interweaving three or more separate strands 22 of one or more materials in a diagonally overlapping pattern, as shown in FIG. 4. Simple braids with more than three strands 22 can be flat or tubular and generally contain an odd number of strands.

One characteristic of a braided line 12 that is desirable for the present invention is that it stretches and compresses as a result of longitudinal force. As the line 12 is pulled apart, the braid strands 22 become more parallel to each other. At the maximum usable stretch, that is, the maximum amount of stretch that can be employed for a particular application, the line 12 is uncompressed and has an uncompressed diameter. As the line 12 is pushed together longitudinally, the braid strands 22 become more perpendicular to each other. At the maximum usable compression, that is, the minimum length of the line 12 that can be employed for a particular application, the line 12 is compressed and has a compressed diameter.

The material of which the line 12 is constructed is determined by the amount of tension force the tie down 10 is expected to endure and the desired working life of the tie down 10, both of which are determined by application for which the tie down 10 is designed. Possible materials include nylons, polyesters, polypropylenes, aramids, and the like. Each material has its characteristic advantages and disadvantages for particular applications including, for example, strength, resistance to abrasion, and cost. The materials may be used singly or in combination, as appropriate.

The elastic tube 14 is a hollow cylinder of elastic material. With most materials, the tube 14 can stretch both longitudinally along its length and radially in its diameter. The material of which the tube 14 is constructed is determined by the amount of force the tie down 10 is expected to endure and the desired working life of the tie down 10, both of which are determined by application for which the tie down 10 is designed. Possible materials include silicones, urethanes, gum rubbers, latexes, neoprenes, polystyrenes, polypropylenes, polyethylenes, fluoroelastomers, polymers, copolymers, terpolymers, and the like. Each material has its characteristic advantages and disadvantages for particular applications including, for example, strength, amount of stretch, and cost. The materials may be used singly or in combination, as appropriate.

In one configuration, the inside diameter of the unstretched tube 14 is at least as large as the compressed diameter of the line 12. When the tube 14 is in its unstretched state, that is, there is no tension force on the tube 14, the line 12 can fully compress within the tube 14 without causing radially stretching of the tube 14. In another configuration, the inside diameter of the unstretched tube 14 is at least as large as the uncompressed diameter of the line 12. When the tube 14 is in its unstretched state, the fully compressed line 12 causes the tube 14 to stretch radially.

There are a number of different ways known in the art to secure the tube 12 to the braided line 14, both permanent and temporary. Depending on its form, the securement may be at the end 20 of the tube 14 or adjacent to the tube end 20. References in the present specification to the securement 16 being at the tube end 20 include all locations at or adjacent to the tube end 20 appropriate for the particular securement 16.

The securement 16 must be strong enough to prevent separation of the tube 12 from the line 14 while at full extension. The present invention contemplates the use of three basic types of securements 16: adhesives, clamps, and shrink tubing.

Adhesives provide a chemical bond between the line 12 and tube 14. The adhesive 30, which starts in liquid form, is placed between the line 12 and tube 14 at the ends 20 of the tube 14, as FIG. 5, and allowed to harden. There are many different adhesives known in the art, and the selection of an appropriate adhesive is determined by the use to which the tie down 10 will be put. If, for example, the tube 14 is rubber and the line 12 is nylon, only certain adhesives will bond to these two materials. Further, if the tie-down is for use in a wet or high-moisture environment, the number of adhesives is further limited. Adhesive materials include silicones, cyanoacrylates, epoxies, polyurethanes, polymers, polysilicones, and elastomers.

Figure 6:
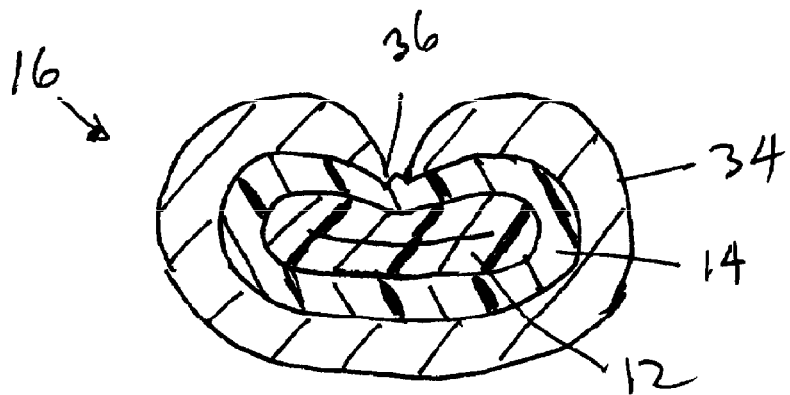
FIG. 6 is an enlarged, cross-sectional view of a crimp securement.

Clamps are mechanical securements. There are permanent clamps, such as crimps, and there are temporary clamps, such as hose clamps. A crimp securement is shown in FIG. 6. A non-continuous metal ring 34 is placed around the tube 14 within which is the line 12. The abutting ends 36 of the ring 34 are pressed inwardly against the tube 14, which presses against the line 12. The pressure from the ring ends 36 secures the line 12 and tube 14 together. Crimps are not a preferred method of securement because they weaken the tube 14 and line 12 by cutting into the tube 14, shorting the useful life of the tie down 10. Hose clamps that use a screw mechanism for tightening can provide a temporary securement, but can also weaken the tube 14.

Shrink tubing is a hollow tube that shrinks in diameter upon the application of heat. The amount of shrinkage is a function of the material from which the tubing is made. It provides a secure attachment by shrinking enough to form a strong friction fit between itself and the item within. For the present invention, the shrink tubing 32 is position over the end 20 of the tube 14 extending to either side, as in FIG. 5. Heat is applied to the shrink tubing 32 until it is in the desired state. Since the tube 14 is elastic, the shrink tubing will press in on the tube 14, pressing it against the line 12. Shrink tubing is available in a number of different materials, including neoprene, polyvinyl chloride, polyolefin, KYNAR polymer, MYLAR polyester, and TEFLON.

Figure 5:
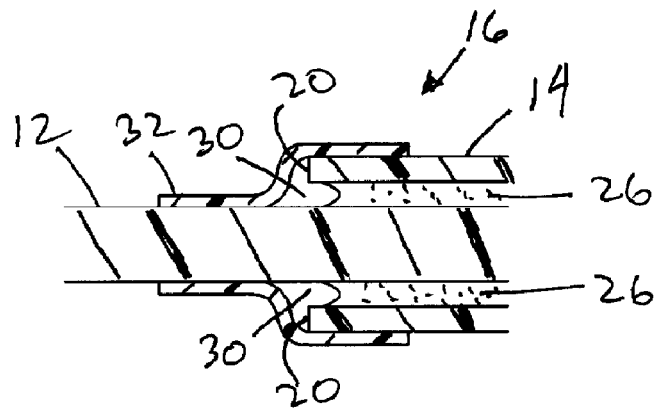
FIG. 5 is an enlarged, cross-sectional view of an adhesive and shrink tubing securement.

As the tie down 10 is stretched and relaxed, the line 12 rubs on the inner surface of the tube 14. The rubbing can cause the line 12 and/or tube 14 to abrade and weaken. Optionally, in order to reduce the amount of abrasion, a lubricant 26 may be placed in the tube 14, as shown in FIG. 5. Liquid lubricants are not particularly desirable because they can leak from the ends of the tie down 10 and, being oil based, may cause degradation of the line 12 and/or tube. Solid lubricants 26, in the form of a dry powder, are more desirable. Graphite and molybdenum disulfide ($MoS_2$) are the predominant materials. Other materials include boron nitride, polytetrafluoroethylene (PTFE), talc, calcium fluoride, cerium fluoride, and tungsten disulfide.

There are two basic methods for constructing the tie down 10. In the first, the line 12 is threaded through the tube 14 and one end is secured. Then the line is compressed into the tube 14 and the second end is secured. This method works when the inside diameter of the tube 14 is at least the compressed diameter of the line 12. In the second method, the line 12 is threaded through the tube 14 and one end is secured. Then the tube 14 is stretched to its full design length and the second end is secured. This method works for either configuration of line and tube diameters.

Figure 1:
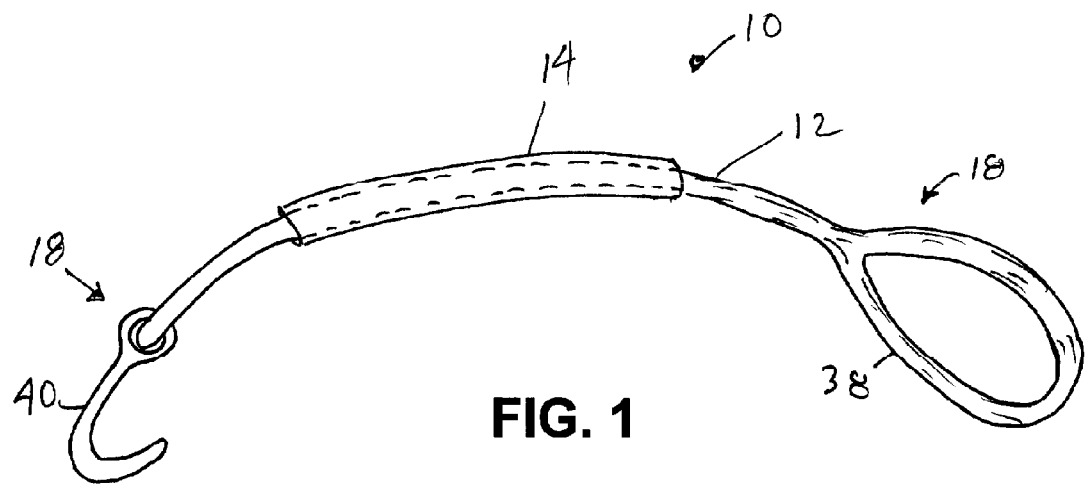
FIG. 1 is a perspective view in phantom of the tie down of the present invention.

The ends of the tie down 10 are configured for attachment, as at 18, with the configuration depending upon the use to which the tie down 10 is being put. In FIG. 1, the line 12 extends beyond the ends 20 of the tube 14. The line ends 24 can be configured as desired. Examples include forming into a loop 38 and/or attaching a hook 40, as in FIG. 1, leaving the line free, or other attachments as desired.

Figure 7:
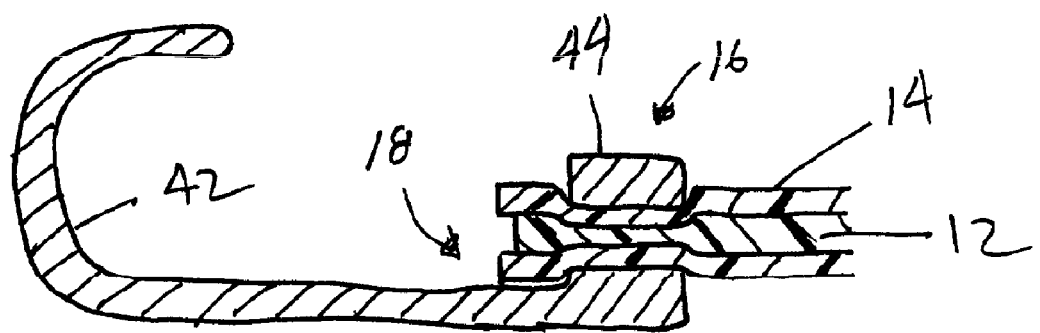
FIG. 7 is an enlarged, cross-sectional view of an alternate configuration of a tie down attachment.

Alternatively, the line 12 does not extend from the tube ends 20 and another mechanism for attachment is used. In one example, shown in FIG. 7, a hook 42 extends from a crimp 44 that secures the line 12 to the tube 14.

It is also contemplated by the present invention that each end can be configured for attachment differently.

Thus it has been shown and described an elastic tie down which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

I claim:

1. A tie down for connecting two objects, said tie down comprising:
   (a) an elastic tube having an unstretched state, a stretched state, and two ends;
   (b) a braided line extending through said tube, said line having a compressed state and an uncompressed state; and
   (c) a mechanical securement at each of said tube ends to secure said line to said tube wherein said line is in said compressed state when said tube is in said unstretched state and said line is in said uncompressed state when said tube is in said stretched state.

2. The tie down of claim 1 further comprising attachments for attaching to each of said objects.

3. The tie down of claim 1 wherein said line extends from the ends of said tube.

4. The tie down of claim 1 wherein said tube has an inside diameter in said unstretched state that is at least as large as a diameter of said line in said compressed state.

5. The tie down of claim 1 wherein said tube has an inside diameter in said unstretched state that is at least as large as a diameter of said line in said uncompressed state.

6. A tie down for connecting two objects, said tie down comprising:
   (a) an elastic tube having an unstretched state, a stretched state, and two ends;
   (b) a braided line extending through said tube and extending from the ends of said tube, said line having a compressed state and an uncompressed state;
   (c) a mechanical securement at each of said tube ends to secure said line to said tube wherein said line is in said compressed state when said tube is in said unstretched state and said line is in said uncompressed state when said tube is in said stretched state; and
   (d) attachments for attaching to each of said objects.

7. The tie down of claim 6 wherein said tube has an inside diameter in said unstretched state that is at least as large as a diameter of said line in said compressed state.

8. The tie down of claim 6 wherein said tube has an inside diameter in said unstretched state that is at least as large as a diameter of said line in said uncompressed state.

* * * * *